US011600861B2

(12) United States Patent
Cho et al.

(10) Patent No.: US 11,600,861 B2
(45) Date of Patent: Mar. 7, 2023

(54) ADDITIVE, ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si (KR)

(72) Inventors: Wonseok Cho, Yongin-si (KR); Younghye Kang, Yongin-si (KR); Dongyoung Kim, Yongin-si (KR); Soojin Kim, Yongin-si (KR); Aeran Kim, Yongin-si (KR); Suyeol Ryu, Yongin-si (KR); Jeongmin Shin, Yongin-si (KR); Junyong Lee, Yongin-si (KR); Tae Jin Lee, Yongin-si (KR); Jin-Hyeok Lim, Yongin-si (KR); Myunghwan Jeong, Yongin-si (KR); Hyunbong Choi, Yongin-si (KR); Jungmin Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 160 days.

(21) Appl. No.: 16/904,773

(22) Filed: Jun. 18, 2020

(65) Prior Publication Data
US 2020/0403272 A1 Dec. 24, 2020

(30) Foreign Application Priority Data

Jun. 20, 2019 (KR) .................. 10-2019-0073593
Feb. 14, 2020 (KR) .................. 10-2020-0018299

(51) Int. Cl.
| | | |
|---|---|---|
| H01M 6/16 | (2006.01) | |
| H01M 10/0567 | (2010.01) | |
| H01M 10/0525 | (2010.01) | |
| H01M 10/0569 | (2010.01) | |
| H01M 10/0568 | (2010.01) | |
| H01M 4/525 | (2010.01) | |
| H01M 10/44 | (2006.01) | |
| H01M 4/02 | (2006.01) | |

(52) U.S. Cl.
CPC ....... *H01M 10/0567* (2013.01); *H01M 4/525* (2013.01); *H01M 10/0525* (2013.01); *H01M 10/0568* (2013.01); *H01M 10/0569* (2013.01); *H01M 10/44* (2013.01); *H01M 2004/027* (2013.01); *H01M 2004/028* (2013.01); *H01M 2300/0028* (2013.01)

(58) Field of Classification Search
CPC ......... H01M 10/0567; H01M 10/0569; H01M 10/0566; H01M 10/0525; H01M 10/052; H01M 10/0568; H01M 10/44; H01M 4/525; H01M 4/52; H01M 4/48; H01M 2004/027; H01M 2004/028; H01M 2300/0028; H01M 2300/0037
See application file for complete search history.

(56) References Cited

U.S. PATENT DOCUMENTS

| | | | | |
|---|---|---|---|---|
| 8,043,745 | B2 * | 10/2011 | Kotato | ............ H01M 10/0525 |
| | | | | 429/188 |
| 9,257,720 | B2 * | 2/2016 | Okamoto | .......... H01M 10/0567 |
| 9,934,911 | B2 * | 4/2018 | Shimamoto | ........... H01M 4/485 |
| 2010/0021823 | A1 | 1/2010 | Onuki et al. | |
| 2013/0337317 | A1 | 12/2013 | Shima et al. | |
| 2014/0178748 | A1 | 6/2014 | Chernyshov et al. | |
| 2018/0183099 | A1 | 6/2018 | Sato et al. | |
| 2019/0288337 | A1 | 9/2019 | Choi et al. | |

FOREIGN PATENT DOCUMENTS

| | | |
|---|---|---|
| CN | 103326068 A | 9/2013 |
| CN | 103887562 A | 6/2014 |
| KR | 10-2019-0109099 A | 9/2019 |

OTHER PUBLICATIONS

Chinese Office action dated Jan. 11, 2023 and Chinese Search Report dated Jan. 3, 2023.

* cited by examiner

*Primary Examiner* — Raymond Alejandro
(74) *Attorney, Agent, or Firm* — Lee IP Law, P.C.

(57) ABSTRACT

An additive, an electrolyte for a rechargeable lithium battery, and a rechargeable lithium battery, the additive being represented by Chemical Formula 1:

[Chemical Formula 1]

$$R^1-\overset{\overset{O}{\|}}{\underset{\underset{O}{\|}}{S}}-N\overset{R^2}{\underset{P-X^3}{\diagdown}}\underset{X^1\diagdown}{\overset{}{\diagup}}\overset{}{\underset{R^3\ R^4}{(\ )_n}}\overset{R^6}{\underset{R^5}{\diagdown}}$$

10 Claims, 6 Drawing Sheets

ADDITIVE, ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2019-0073593, filed on Jun. 20, 2019, in the Korean Intellectual Property Office, and Korean Patent Application No. 10-2020-0018299 filed on Feb. 14, 2020 in the Korean Intellectual Property Office, both entitled: "Additive, Electrolyte for Rechargeable Lithium Battery and Rechargeable Lithium Battery Including the Same," are incorporated by reference herein in their entirety.

BACKGROUND OF THE INVENTION

1. Field

Embodiments relate to an additive, an electrolyte for a rechargeable lithium battery including the same, and a rechargeable lithium battery.

2. Description of the Related Art

A rechargeable lithium battery may be recharged and may have three or more times as high energy density per unit weight as a lead storage battery, a nickel-cadmium battery, a nickel hydrogen battery, a nickel zinc battery, or the like. It may be also charged at a high rate and thus, is commercially manufactured for a laptop, a cell phone, an electric tool, an electric bike, or the like, and additional improvement of energy density have been considered.

Such a rechargeable lithium battery is manufactured by injecting an electrolyte into a battery cell, which includes a positive electrode including a positive active material capable of intercalating/deintercalating lithium ions and a negative electrode including a negative active material capable of intercalating/deintercalating lithium ions.

An electrolyte may include an organic solvent in which a lithium salt is dissolved and may determine stability and performance of a rechargeable lithium battery.

SUMMARY OF THE INVENTION

The embodiments may be realized by providing an additive represented by Chemical Formula 1:

[Chemical Formula 1]

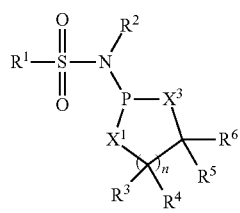

wherein, in Chemical Formula 1, $X^1$ and $X^2$ are each independently O, S, $CR^aR^b$, or $NR^c$, at least one of $X^1$ and $X^2$ being O or S, $R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^a$, $R^b$, $R^c$, and $R^3$ to $R^6$ are each independently hydrogen, a substituted or unsubstituted C1 to C5 alkyl group, a substituted or unsubstituted C2 to C5 alkenyl group, or a combination thereof, and n is an integer selected from 1 to 3.

The additive represented by Chemical Formula 1 may be represented by Chemical Formula 1A:

[Chemical Formula 1A]

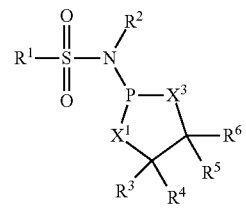

wherein, in Chemical Formula 1A, $X^1$ and $X^2$ may be each independently O, S, $CR^aR^b$, or $NR^c$, at least one of $X^1$ and $X^2$ being O or S, $R^1$ and $R^2$ may be each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, and $R^a$, $R^b$, $R^c$, and $R^3$ to $R^6$ may be each independently hydrogen, a substituted or unsubstituted C1 to C5 alkyl group, a substituted or unsubstituted C2 to C5 alkenyl group, or a combination thereof.

The additive represented by Chemical Formula 1 may be represented by one of Chemical Formula 1-1 to Chemical Formula 1-3:

[Chemical Formula 1-1]

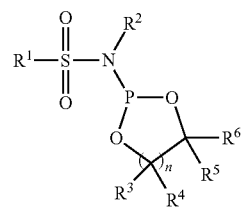

[Chemical Formula 1-2]

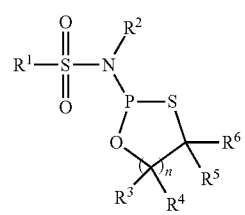

[Chemical Formula 1-3]

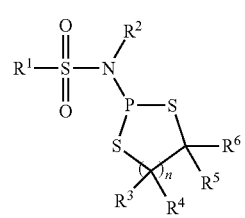

wherein, in Chemical Formula 1-1 to Chemical Formula 1-3, $R^1$ and $R^2$ may be each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^3$ to $R^6$ may be each independently hydrogen, a substituted or unsubstituted C1 to C5 alkyl group, a substituted or unsubstituted C2 to C5 alkenyl group, or a combination thereof, and n may be an integer selected from 1 to 3.

$R^1$ and $R^2$ of Chemical Formula 1 may be each independently a substituted or unsubstituted C1 to C10 alkyl group or a substituted or unsubstituted C2 to C5 alkenyl group.

The embodiments may be realized by providing an electrolyte for a rechargeable lithium battery, the electrolyte including a non-aqueous organic solvent, a lithium salt, and the additive according to an embodiment.

The additive may be included in the electrolyte in an amount of about 0.1 wt % to about 10 wt %, based on a total weight of the electrolyte.

The additive may be included in the electrolyte in an amount of about 0.1 wt % to about 3.0 wt %, based on a total weight of the electrolyte.

The embodiments may be realized by providing a rechargeable lithium battery including a positive electrode including a positive active material; a negative electrode including a negative active material; and the electrolyte according to an embodiment.

The positive active material may include a composite oxide including cobalt, manganese, nickel, or a combination thereof, and lithium.

The positive active material may be represented by Chemical Formula 2:

$Li_aM^1_{1-y1-z1}M^2_{y1}M^3_{z1}O_2$      [Chemical Formula 2]

wherein, in Chemical Formula 2, $0.9 \le a \le 1.8$, $0 \le y1 < 1$, $0 \le z1 < 1$, $0 \le y1+z1 < 1$, and $M^1$, $M^2$, and $M^3$ are each independently Ni, Co, Mn, Al, Sr, Mg, La, or a combination thereof.

BRIEF DESCRIPTION OF THE DRAWINGS

Features will be apparent to those of skill in the art by describing in detail exemplary embodiments with reference to the attached drawings in which.

DETAILED DESCRIPTION OF THE EMBODIMENTS

Figure 1:
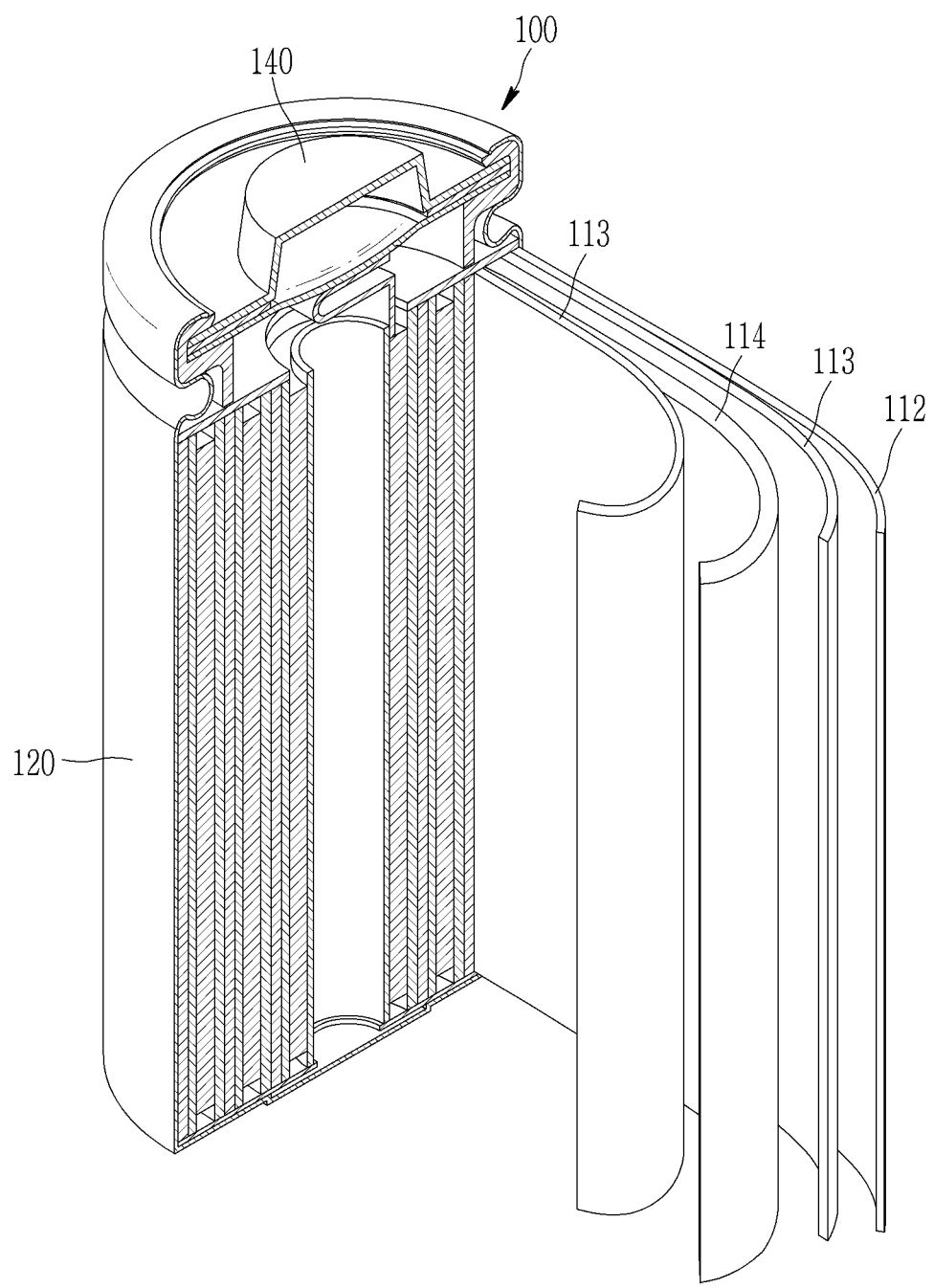
FIG. 1 is an exploded perspective view or a rechargeable lithium battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers or elements may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, 'substituted' refers to replacement of hydrogen of a compound by a substituent selected from a halogen atom (F, Br, Cl, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid group or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof.

Hereinafter, an additive (e.g., electrolyte additive) according to an embodiment is described.

The additive according to an embodiment may be represented by Chemical Formula 1.

[Chemical Formula 1]

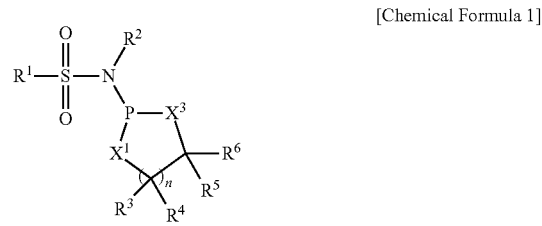

In Chemical Formula 1, $X^1$ and $X^2$ may each independently be, e.g., O, S, $CR^aR^b$, or $NR^c$. In an implementation, at least one of $X^1$ and $X^2$ may be, e.g., O or S.

$R^1$ and $R^2$ may each independently be or include, e.g., a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^a$, $R^b$, $R^c$, and $R^3$ to $R^6$ may each independently be or include, e.g., hydrogen, a substituted or unsubstituted C1 to C5 alkyl group, a substituted or unsubstituted C2 to C5 alkenyl group, or a combination thereof, and n may be, e.g., an integer selected from 1 to 3.

In an implementation, when n is 2 or 3, the 2 or 3 $R^3$ and/or the 2 or 3 $R^4$ may be the same or different.

The additive represented by Chemical Formula 1 may include a sulfonamide group and a cyclic phosphone functional group, wherein phosphine is a phospholane derivatives.

The cyclic phosphone functional group may have a lower oxidation potential than a linear phosphone functional group, and it may be more easily oxidized in an electrolyte to form a solid polyphosphate film on the surface of the positive electrode, thereby suppressing a collapse of the positive electrode and contributing to performance improvement at a high temperature of the battery.

The sulfonamide group may be reductively decomposed at the surface of the negative electrode of a rechargeable lithium battery to form a solid electrolyte interface (SEI) film having excellent ion conductivity on the surface of the negative electrode. In an implementation, the initial formation of the SEI film may help suppress decomposition of the surface of the negative electrode, which could occur during operations at high temperature cycles, and may help prevent an oxidation reaction of the electrolyte and thus decrease a resistance increase rate in the rechargeable lithium battery.

In an implementation, the compound represented by Chemical Formula 1 may be represented by, e.g., Chemical Formula 1A, Chemical Formula 1B, or Chemical Formula 1C.

[Chemical Formula 1A]

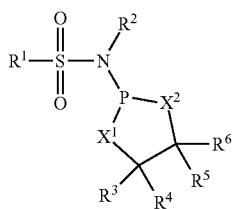

[Chemical Formula 1B]

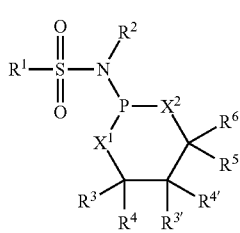

[Chemical Formula 1C]

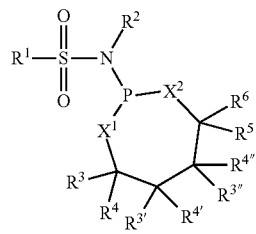

In Chemical Formula 1A to Chemical Formula 1C, $X^1$, $X^2$, and $R^1$ to $R^6$ may be defined the same as those of Chemical Formula 1 described above, and $R^{3'}$, $R^{3''}$, $R^{4'}$, and $R^{4''}$ may be defined the same as $R^3$ and $R^4$ of Chemical Formula 1.

In an implementation, the compound represented by Chemical Formula 1 may be represented by Chemical Formula 1A or Chemical Formula 1B, e.g., may be represented by Chemical Formula 1A.

In an implementation, the compound represented by Chemical Formula 1 may be represented by one of Chemical Formula 1-1 to Chemical Formula 1-3.

[Chemical Formula 1-1]

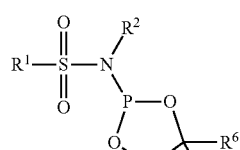

[Chemical Formula 1-2]

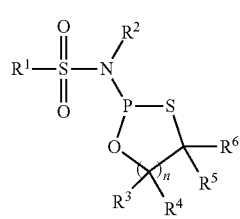

[Chemical Formula 1-3]

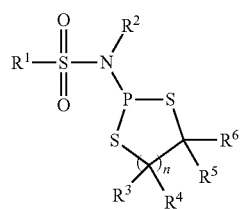

In Chemical Formula 1-1 to Chemical Formula 1-3, $R^1$ to $R^6$ and n may be defined the same as those of Chemical Formula 1 described above.

In an implementation, the compound represented by Chemical Formula 1 may be represented by Chemical Formula 1-1 or Chemical Formula 1-2, e.g., may be represented by Chemical Formula 1-1.

In an implementation, n in Chemical Formulae 1-1 to 1-3 may be 1 or 2, e.g., n may be 1.

In an implementation, $R^1$ and $R^2$ of Chemical Formula 1 may each independently be or include, e.g., a substituted or unsubstituted C1 to C10 alkyl group or a substituted or unsubstituted C2 to C5 alkenyl group.

In an implementation, $R^1$ and $R^2$ of Chemical Formula 1 may each independently be or include, e.g., a substituted or unsubstituted C1 to C10 alkyl group. In an implementation, $R^1$ and $R^2$ of Chemical Formula 1 may be, e.g., a methyl group, an ethyl group, an n-propyl group, or an iso-propyl group.

The electrolyte for a rechargeable lithium battery according to another embodiment may include a non-aqueous organic solvent, a lithium salt, and the aforementioned additive.

In an implementation, the additive may be included in the electrolyte in an amount of about 0.1 wt % to about 10 wt %, e.g. about 0.1 wt % to about 3.0 wt % or about 0.2 wt % to about 2.0 wt %, based on a total weight of the electrolyte for the rechargeable lithium battery.

When the amount range of the additive is as described above, a rechargeable lithium battery having improved cycle-life characteristics may be provided by preventing increase in resistance at high temperatures.

Maintaining the amount of the additive represented by Chemical Formula 1 at about 0.1 wt % or greater may help prevent a reduction on the high temperature storage property. Maintaining the amount of the additive represented by Chemical Formula 1 at about 10 wt % or less may help prevent an increase in an interface resistance, thereby helping to prevent a reduction in cycle-life.

The non-aqueous organic solvent serves as a medium for transmitting ions taking part in the electrochemical reaction of a battery.

The non-aqueous organic solvent may include, e.g., a carbonate solvent, an ester solvent, an ether solvent, a ketone solvent, an alcohol solvent, or an aprotic solvent.

The carbonate solvent may include, e.g., dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include, e.g., methyl acetate, ethyl acetate, n-propyl acetate, dimethylacetate, methylpropionate, ethylpropionate, propylpropionate, decanolide, mevalonolactone, caprolactone, or the like. The ether solvent may include dibutyl ether, tetraglyme, diglyme, dimethoxyethane, 2-methyltetrahydrofuran, tetrahydrofuran, or the like. The ketone solvent may include, e.g., cyclohexanone or the like. The alcohol solvent may include, e.g., ethanol, isopropyl alcohol, or the like. The aprotic solvent may include, e.g., nitriles such as R—CN (wherein R is a hydrocarbon group having a C2 to C20 linear, branched, or cyclic structure and may include a double bond, an aromatic ring, or an ether bond), or the like, dioxolanes such as 1,3-dioxolane or the like, sulfolanes, or the like.

The non-aqueous organic solvent may be used alone or in a mixture. When the organic solvent is used in a mixture, the mixture ratio may be controlled in accordance with a desirable battery performance.

In an implementation, the carbonate solvent may be prepared by mixing a cyclic carbonate and a linear carbonate. When the cyclic carbonate and linear carbonate are mixed together in a volume ratio of about 1:1 to about 1:9, an electrolyte performance may be improved.

The non-aqueous organic solvent may further include an aromatic hydrocarbon organic solvent in addition to the carbonate solvent. In an implementation, the carbonate solvent and the aromatic hydrocarbon organic solvent may be mixed in a volume ratio of about 1:1 to about 30:1.

The aromatic hydrocarbon organic solvent may be an aromatic hydrocarbon-based compound of Chemical Formula 3.

[Chemical Formula 3]

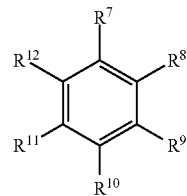

In Chemical Formula 3, $R^7$ to $R^{12}$ may each independently be, e.g., hydrogen, a halogen, a C1 to C10 alkyl group, a haloalkyl group, or a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In an implementation, the electrolyte may further include vinylene carbonate or an ethylene carbonate compound of Chemical Formula 4, e.g., in an effort to help improve cycle-life of a battery.

[Chemical Formula 4]

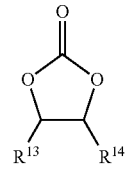

In Chemical Formula 4, $R^{13}$ and $R^{14}$ may each independently be, e.g., hydrogen, a halogen, a cyano group (CN), a nitro group ($NO_2$), or a fluorinated C1 1 to C5 alkyl group. In an implementation, at least one of $R^{13}$ and $R^{14}$ may be a halogen, a cyano group (CN), a nitro group ($NO_2$), or a fluorinated C1 to C5 alkyl group and $R^{13}$ and $R^{14}$ are not simultaneously hydrogen.

Examples of the ethylene carbonate compound may include difluoroethylene carbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving cycle-life may be used within a suitable range.

The lithium salt dissolved in the non-aqueous organic solvent supplies lithium ions in a battery, facilitates a basic operation of a rechargeable lithium battery, and improves transportation of the lithium ions between positive and negative electrodes. Examples of the lithium salt may include $LiPF_6$, $LiBF_4$, $LiSbF_6$, $LiAsF_6$, $LiN(S_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, e.g., an integer ranging from 1 to 20), LiCl, LiI and LiB(C$_2$O$_4$)$_2$ (lithium bis(oxalato) borate, LiBOB). The lithium salt may be used in a concentration ranging from about 0.1 M to about 2.0 M. When the lithium salt is included at the above concentration range, an electrolyte may have excellent performance and lithium ion mobility due to optimal electrolyte conductivity and viscosity.

Another embodiment provides a rechargeable lithium battery including a positive electrode including a positive active material; a negative electrode including a negative active material; and the aforementioned electrolyte.

The positive electrode includes a current collector and a positive active material layer on the current collector and including a positive active material.

The positive active material may include lithiated intercalation compounds that reversibly intercalate and deintercalate lithium ions.

In an implementation, at least one composite oxide of lithium and a metal of cobalt, manganese, nickel, or a combination thereof may be used.

Examples of the positive active material may be a compound represented by one of chemical formulae below.

Li$_a$A$_{1-b}$X$_b$D$_2$ (0.90≤a≤1.8, 0≤b≤0.5); Li$_a$A$_{1-b}$X$_b$O$_{2-c}$D, (0.90≤a≤1.8, 0≤b≤0.5, 0≤c≤0.05); Li$_a$E$_{1-b}$X$_b$O$_{2-c}$D$_c$ (0.90≤a≤1.8, 0≤b≤0.5, 0≤c≤0.05); Li$_a$E$_{2-b}$X$_b$O$_{4-c}$D$_c$ (0.90≤a≤1.8, 0≤b≤0.5, 0≤c≤0.05); Li$_a$Ni$_b$Co$_b$X$_c$D$_\alpha$ (0.90≤a≤1.8, 0≤b≤0.5, 0≤c≤0.5, 0<α≤2); Li$_a$Ni$_{1-b-c}$Co$_b$X$_c$O$_{2-\alpha}$T$_2$ (0.90≤a≤1.8, 0≤b≤0.5, 0≤c≤0.05, 0<α<2); Li$_a$Ni$_{1-b-c}$Co$_b$X$_c$O$_{2-\alpha}$T$_2$ (0.90≤a≤1.8, 0≤b≤0.5, 0≤c≤0.05, 0<α<2); Li$_a$Ni$_{1-b-c}$Mn$_b$X$_c$D$_\alpha$ (0.90≤a≤1.8, 0≤b≤0.5, 0≤c≤0.05, 0<α<2); Li$_a$Ni$_{1-b-c}$Mn$_b$X$_c$O$_{2-\alpha}$T$_\alpha$ (0.90≤a≤1.8, 0≤b≤0.5, 0≤c≤0.05, 0<α<2); Li$_a$Ni$_{1-b-c}$Mn$_b$X$_c$O$_{2-\alpha}$T$_2$ (0.90≤a≤1.8, 0≤b≤0.5, 0≤c≤0.05, 0<α<2); Li$_a$Ni$_b$E$_c$G$_d$O$_2$ (0.90≤a≤1.8, 0≤b≤0.9, 0≤c≤0.5, 0.001≤d≤0.1); Li$_a$Ni$_b$Co$_c$Mn$_d$G$_e$O$_2$ (0.90≤a≤1.8, 0≤b≤0.9, 0<c≤0.5, 0≤d≤0.5, 0.001≤e≤0.1); Li$_a$NiG$_b$O$_2$ (0.90≤a≤1.8, 0.001≤b≤0.1); Li$_a$CoG$_b$O$_2$ (0.90≤a≤1.8, 0.001≤b≤0.1); Li$_a$Mn$_{1-b}$G$_b$O$_2$ (0.90≤a≤1.8, 0.001≤b≤0.1); Li$_a$Mn$_2$G$_b$O$_4$ (0.90≤a≤1.8, 0.001≤b≤0.1); Li$_a$Mn$_{1-g}$G$_g$PO$_4$ (0.90≤a≤1.8, 0≤g≤0.5); QO$_2$; QS$_2$; LiQS$_2$; V$_2$O$_5$; LiV$_2$O$_5$; LiZO$_2$; LiNiVO$_4$; LiNiVO$_4$; Li$_{(3-f)}$J$_2$(PO$_4$)$_3$ (0≤f≤2); Li$_{(3-f)}$Fe$_2$(PO$_4$)$_3$; Li$_a$FePO$_4$ (0.90≤a≤1.8).

In the above chemical formulae, A may be selected from Ni, Co, Mn, and a combination thereof, X may be selected from Al, Ni, Co, Mn, Cr, Fe, Mg, Sr, V, a rare earth element, and a combination thereof, D may be selected from O, F, S, P, and a combination thereof, E may be selected from Co, Mn, and a combination thereof, T may be selected from F, S, P, and a combination thereof, G may be selected from Al, Cr, Mn, Fe, Mg, La, Ce, Sr, V, and a combination thereof, Q may be selected from Ti, Mo, Mn, and a combination thereof, Z may be selected from Cr, V, Fe, Sc, Y, and a combination thereof, and J may be selected from V, Cr, Mn, Co, Ni, Cu, and a combination thereof.

The compounds may have a coating layer on the surface, or may be mixed with another compound having a coating layer. The coating layer may include at least one coating element compound, e.g., an oxide of a coating element, a hydroxide of a coating element, an oxyhydroxide of a coating element, an oxycarbonate of a coating element, or a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed using a suitable method having no adverse influence on properties of a positive active material by using these elements in the compound. In an implementation, the method may include a suitable coating method (e.g., spray coating, dipping, etc.).

In an implementation, the positive active material may be at least one of lithium composite oxides represented by Chemical Formula 2.

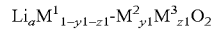  [Chemical Formula 2]

In Chemical Formula 2, 0.9≤a≤1.8, 0≤y1<1, 0≤z1<1, 0≤y1+z1<1, and M$^1$, M$^2$, and M$^3$ are each independently selected from a metal such as Ni, Co, Mn, Al, Sr, Mg, or La, and a combination thereof.

In an implementation, M$^1$ may be Ni, and M$^2$ and M$^3$ may each independently be a metal, e.g., Co, Mn, Al, Sr, Mg, or La.

In an implementation, M$^1$ may be Ni, M$^2$ may be Co, and M$^3$ may be Mn or Al.

Examples of the positive active material according to an embodiment may include Li$_x$Ni$_y$Co$_z$Al$_{1-y-z}$O$_2$ (1≤x≤1.2, 0.5≤y≤1, and 0≤z≤0.5).

The positive active material may be included in an amount of about 90 wt % to about 98 wt %, based on a total weight of the positive active material layer.

In an implementation, the positive active material layer may include a binder and a conductive material. Herein, the binder and the conductive material may be included in an amount of about 1 wt % to about 5 wt %, respectively based on a total amount of the positive active material layer.

The binder may help improve binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may be included to provide electrode conductivity. A suitable electrically conductive material that does not cause a chemical change may be used as a conductive material. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

In an implementation, the current collector may include, e.g., Al.

The negative electrode may include a current collector and a negative active material layer formed on the current collector and including a negative active material.

The negative active material may include a material that reversibly intercalates/deintercalates lithium ions, a lithium metal, a lithium metal alloy, a material capable of doping/dedoping lithium, or a transition metal oxide.

The material that reversibly intercalates/deintercalates lithium ions may include a carbon material. The carbon material may be a suitable carbon negative active material in a rechargeable lithium ion battery. Examples thereof may include crystalline carbon, amorphous carbon, or a mixture thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and the like.

The lithium metal alloy includes an alloy of lithium and, e.g., Na, K, Rb, Cs, Fr, Be, Mg, Ca, Sr, Si, Sb, Pb, In, Zn, Ba, Ra, Ge, Al, or Sn.

The material capable of doping/dedoping lithium may be Si, a Si—C composite, $SiO_x$ (0<x<2), a Si-Q alloy wherein Q is an element selected from an alkali metal, an alkaline-earth metal, a Group 13 element, a Group 14 element, a Group 15 element, a Group 16 element, a transition metal, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may be vanadium oxide, lithium vanadium oxide, or lithium titanium oxide.

In the negative active material layer, the negative active material may be included in an amount of about 95 wt % to about 99 wt % based on a total weight of the negative active material layer.

In an implementation, the negative active material layer may include a binder, and optionally a conductive material. In the negative active material layer, a content of the binder may be about 1 wt % to about 5 wt % based on a total weight of the negative active material layer. When the negative active material layer further includes a conductive material, the negative active material layer includes about 90 wt % to about 98 wt % of the negative active material, about 1 wt % to about 5 wt % of the binder, and about 1 wt % to about 5 wt % of the conductive material.

The binder may help improve binding properties of negative active material particles with one another and with a current collector. The binder includes a non-water-soluble binder, a water-soluble binder, or a combination thereof.

The non-water-soluble binder may include, e.g., polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber binder or a polymer resin binder. The rubber binder may include, e.g., a styrene-butadiene rubber, an acrylated styrene-butadiene rubber (SBR), an acrylonitrile-butadiene rubber, an acrylic rubber, a butyl rubber, a fluorine rubber, or a combination thereof. The polymer resin binder may include, e.g., polytetrafluoroethylene, polyethylene, polypropylene, ethylenepropylene copolymer, polyethyleneoxide, polyvinylpyrrolidone, polyepichlorohydrine, polyphosphazene, polyacrylonitrile, polystyrene, an ethylenepropylenediene copolymer, polyvinylpyridine, chlorosulfonated polyethylene, latex, a polyester resin, an acrylic resin, a phenolic resin, an epoxy resin, polyvinyl alcohol, or a combination thereof.

When the water-soluble binder is used as a negative electrode binder, a cellulose compound may be further used to provide viscosity. The cellulose-compound include, e.g., carboxymethyl cellulose, hydroxypropylmethyl cellulose, methyl cellulose, or alkali metal salts thereof. The alkali metals may be Na, K, or Li. Such a cellulose compound may be included in an amount of about 0.1 to about 3 parts by weight based on 100 parts by weight of the negative active material.

The conductive material is included to provide electrode conductivity. A suitable electrically conductive material that does not cause a chemical change in a battery may be used as a conductive material. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include, e.g., a copper foil, a nickel foil, a stainless steel foil, a titanium foil, a nickel foam, a copper foam, a polymer substrate coated with a conductive metal, or a combination thereof.

The rechargeable lithium battery may further include a separator between the negative electrode and the positive electrode, depending on a type of the rechargeable lithium battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Referring to FIG. 1, a rechargeable lithium battery 100 according to an embodiment may include, e.g., a battery cell including a negative electrode 112, a positive electrode 114 facing the negative electrode 112, a separator 113 interposed between the negative electrode 112 and the positive electrode 114, and an electrolyte for a rechargeable lithium battery impregnating the negative electrode 112, the positive electrode 114, and the separator 113, a battery case 120 housing the battery cell, and a sealing member 140 sealing the battery case 120.

The following Examples and Comparative Examples are provided in order to highlight characteristics of one or more embodiments, but it will be understood that the Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Manufacture of Rechargeable Lithium Battery Cell

Preparation Example 1: Synthesis of Compound A

N-methylmethanesulfonamide (10.0 g, 91.6 mmol) and triethylamine (9.27 g, 91.6 mmol) were dissolved in a dichloromethane solvent under a nitrogen atmosphere, and a temperature was decreased to 0° C. 2-chloro-1,3,2-dioxaphospholane (11.59 g, 91.6 mmol) was added to the mixed solution in a dropwise fashion and then, slowly heated from 0° C. to ambient temperature and stirred for 5 hours. When a reaction was complete, an excess of diethyl ether was added thereto, and a solid not dissolved therein was filtered and removed and then, dried to obtain compound A as a white powder (8.0 g, 80%).

$^1$H NMR (400 MHz, $CDCl_3$): δ 4.30 (m, 2H), 4.06 (m, 2H), 2.95 (s, 3H), 2.85 (s, 3H); $^{31}$P NMR: δ 133.72 (s, 1P).

[Compound A]

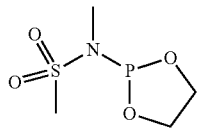

Comparative Preparation Example 1: Synthesis of Compound B

N-methylmethanesulfonamide (10.0 g, 91.6 mmol) and triethylamine (27.8 g, 275 mmol) were dissolved in a dichloromethane solvent under a nitrogen atmosphere and then, cooled down to 0° C. Phosphorus trichloride (12.6 g, 91.6 mmol) was added to the obtained mixed solution in a dropwise fashion and then, maintained at the above temperature and stirred for 1 hour. The temperature was lowered to 0° C., and methanol (5.87 g, 183 mmol) was added thereto in a dropwise fashion, heated to ambient temperature and then, further stirred for 1 hour at ambient temperature. When a reaction was complete, an excess of diethyl ether was added thereto, and a solid not dissolved therein was filtered and removed and then, dried to obtain compound B as a white powder (12.5 g, 68%).

$^1$H NMR (400 MHz, CDCl$_3$): δ 3.68 (s, 6H), 2.95 (s, 3H), 2.85 (s, 3H); $^{31}$P NMR: δ 130.26 (s, 1P).

[Compound B]

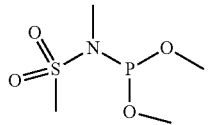

Comparative Preparation Example 2: Synthesis of Compound C

N-methylmethanesulfonamide (10.0 g, 91.6 mmol) and triethylamine (27.8 g, 275 mmol) were dissolved in a dichloromethane solvent under a nitrogen atmosphere and then, cooled down to 0° C. Phosphorus trichloride (12.6 g, 91.6 mmol) was added in a dropwise fashion to this mixed solution and then, maintained at the above temperature and stirred for 1 hour. The temperature was lowered to 0° C., and ethanol (8.43 g, 183 mmol) was added thereto in a dropwise fashion, heated to ambient temperature and further stirred at ambient temperature for one hour. When a reaction was complete, an excess of diethyl ether was added thereto, and a solid not dissolved therein was filtered and removed and then, dried to obtain compound C as a white powder (14.7 g, 70%).

$^1$H NMR (400 MHz, CDCl$_3$): δ 3.85 (q, 4H), 2.95 (s, 3H), 2.85 (s, 3H), 1.25 (t, 6H); $^{31}$P NMR: δ 130.05 (s, 1P).

[Compound C]

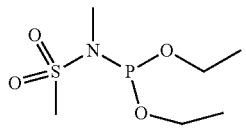

Example 1

LiNi$_{0.88}$Co$_{0.105}$Al$_{0.015}$O$_2$ as a positive active material, polyvinylidene fluoride as a binder, and carbon black as a conductive material were respectively mixed in a weight ratio of 98:1:1 and then, dispersed in N-methyl pyrrolidone to prepare positive active material slurry.

The positive active material slurry was coated on a 20 m-thick Al foil, dried at 100° C., and pressed to manufacture a positive electrode.

Graphite as a negative active material, a styrene-butadiene rubber as a binder, and carboxylmethyl cellulose as a binder were respectively mixed in a weight ratio of 98:1:1 and then, dispersed in distilled water to prepare negative active material slurry.

The negative active material slurry was coated on a 10 μm-thick Cu foil and then, dried at 100° C. and pressed to manufacture a negative electrode.

The positive electrode and the negative electrode were used with a 25 m-thick polyethylene separator and an electrolyte to manufacture a rechargeable lithium battery cell.

A composition of the electrolyte was as follows.
(Electrolyte Composition)
Salt: LiPF$_6$ 1.5 M
Solvent: ethylene carbonate:methylethyl carbonate:dimethyl carbonate (EC:MEC:DMC=2:2:6 volume ratio)
Additive: 0.5 wt % of the compound A
(In the composition of the electrolyte, "wt %" is based on a total amount of the electrolyte (lithium salt+non-aqueous organic solvent+additive))

Example 2

A rechargeable lithium battery cell was manufactured according to the same method as Example 1 except that the amount of the additive was 0.25 wt %.

Example 3

A rechargeable lithium battery cell was manufactured according to the same method as Example 1 except that the amount of the additive was 1.0 wt %.

Example 4

A rechargeable lithium battery cell was manufactured according to the same method as Example 1 except that the amount of the additive was 2.0 wt %.

Comparative Example 1

A rechargeable lithium battery cell was manufactured according to the same method as Example 1 except that the additive was omitted.

Comparative Example 2

A rechargeable lithium battery cell was manufactured according to the same method as Example 1 except that the additive was the compound B according to Comparative Preparation Example 1.

Comparative Example 3

A rechargeable lithium battery cell was manufactured according to the same method as Example 1 except that the additive was the compound C according to Comparative Preparation Example 2.

Battery Characteristics Evaluation

Evaluation 1: CV Characteristics

Figure 2:
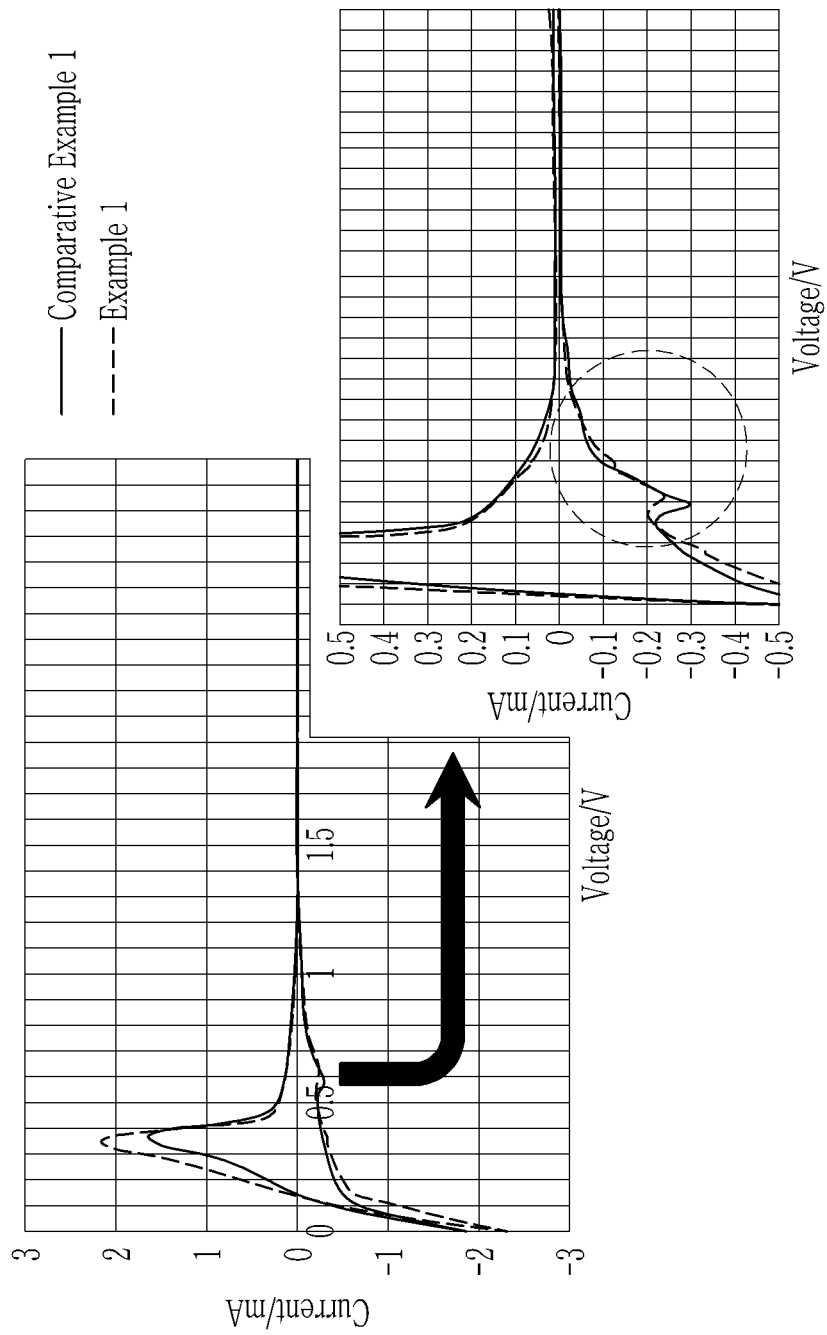
FIG. 2 is a graph showing the results of a negative electrode cyclic voltammetry (CV) at ambient temperature of the electrolytes according to Example 1 and Comparative Example 1.

In order to evaluate electrochemical stability of the electrolytes according to Example 1 and Comparative Example 1, cyclic voltammetry (CV) was measured, and the results are shown in FIG. 2.

A trielectrode electrochemical cell using graphite as a working electrode and Li metal as a reference electrode and a counter electrode was used to measure CV of the negative electrodes. Herein, scan was 3 cycles performed from 3 V to 0 V and then from 0 V to 3 V at a scan rate of 0.1 mV/sec.

FIG. 2 is a graph showing the results of a negative electrode cyclic voltammetry (CV) of the electrolytes according to Example 1 and Comparative Example 1 at ambient temperature.

As shown in FIG. 2, the electrolyte including no additive (Comparative Example 1) exhibited a reduction decomposition peak around 0.6 V, and the electrolyte including the additive (Example 1) exhibited a reduction decomposition peak around 0.8 V.

These show that the additive might cause an interaction with the solvent, and accordingly, as for the electrolyte according to Example 1, an initial SEI film on the negative electrode was expected to form over a wide voltage range before decomposition of the solvent during the charge in which lithium ions were intercalated into the negative electrode. Accordingly, the rechargeable lithium battery cell adopting the electrolyte of Example 1 was expected to have excellent battery performance compared with the rechargeable lithium battery cell adopting the electrolyte having no initial SEI film according to Comparative Example 1.

Evaluation 2: Cycle-Life Characteristics

The rechargeable lithium battery cells according to Examples 1 to 4 and Comparative Example 1 were respectively CC (constant current)-CV (constant voltage) charged at 4 A and 4.2 V at ambient temperature and then, cut off at 100 mA and paused for 10 minutes. Subsequently, the cells were CC discharged at 20 A and then, cut off at 2.5 V and paused for 30 minutes, which was regarded as 1 cycle and 250 cycles repeated to evaluate cycle-life characteristics, and the results are shown in FIG. 3.

In addition, the rechargeable lithium battery cells according to Example 1 and Comparative Examples 2 and 3 were respectively CC-CV charged at 4 A and 4.2 V at ambient temperature and then, cut off at 100 mA and paused for 10 minutes. Subsequently, the cells were CC discharged at 10 A and then, cut off at and 2.5 V and paused for 30 minutes, which was regarded as 1 cycle and 900 cycles repeated to evaluate cycle-life characteristics, and the results are shown in FIG. 4.

Figure 3:
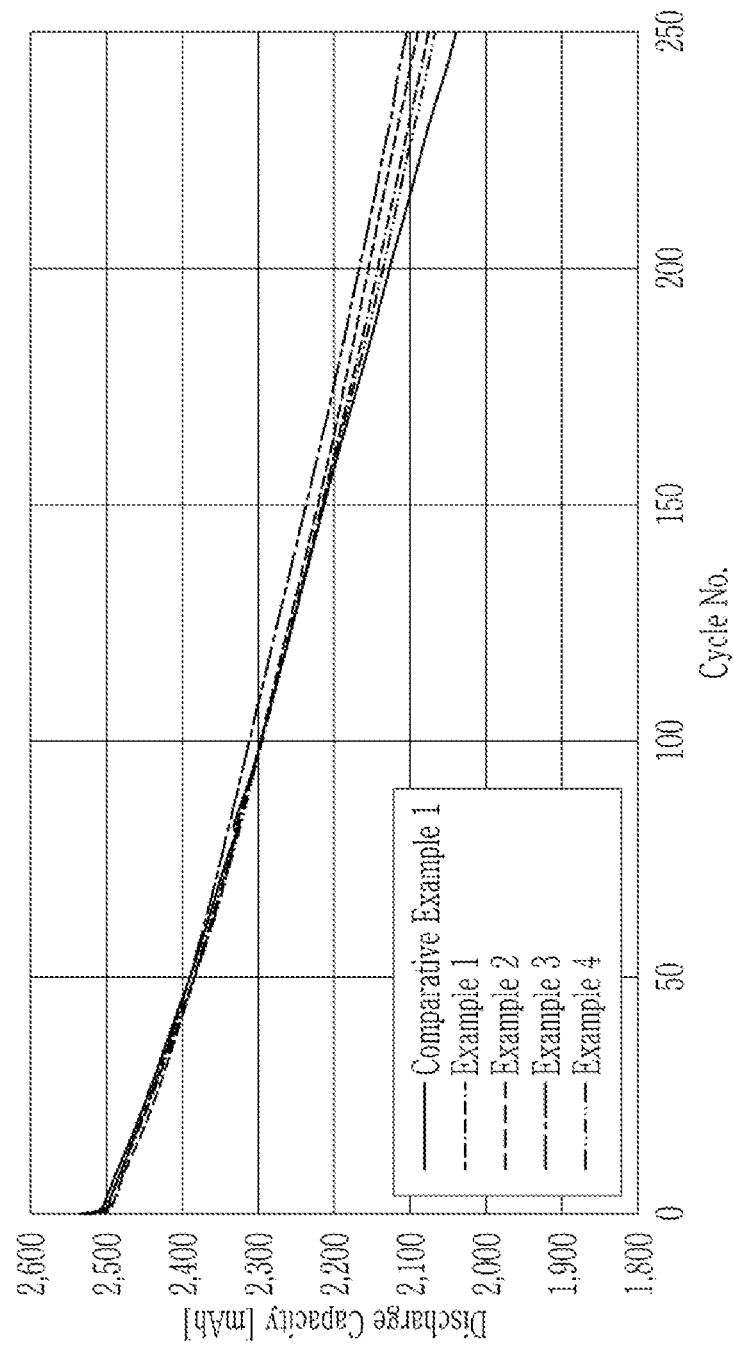
FIG. 3 is a graph showing discharge capacities measured according to cycles of rechargeable lithium battery cells according to Examples 1 to 4 and Comparative Example 1, which measured against cells having a capacity of 2,500 mAh.

FIG. 3 is a graph showing discharge capacities measured according to cycles of rechargeable lithium battery cells according to Examples 1 to 4 and Comparative Example 1, which measured against cells having a capacity of 2,500 mAh.

Figure 4:
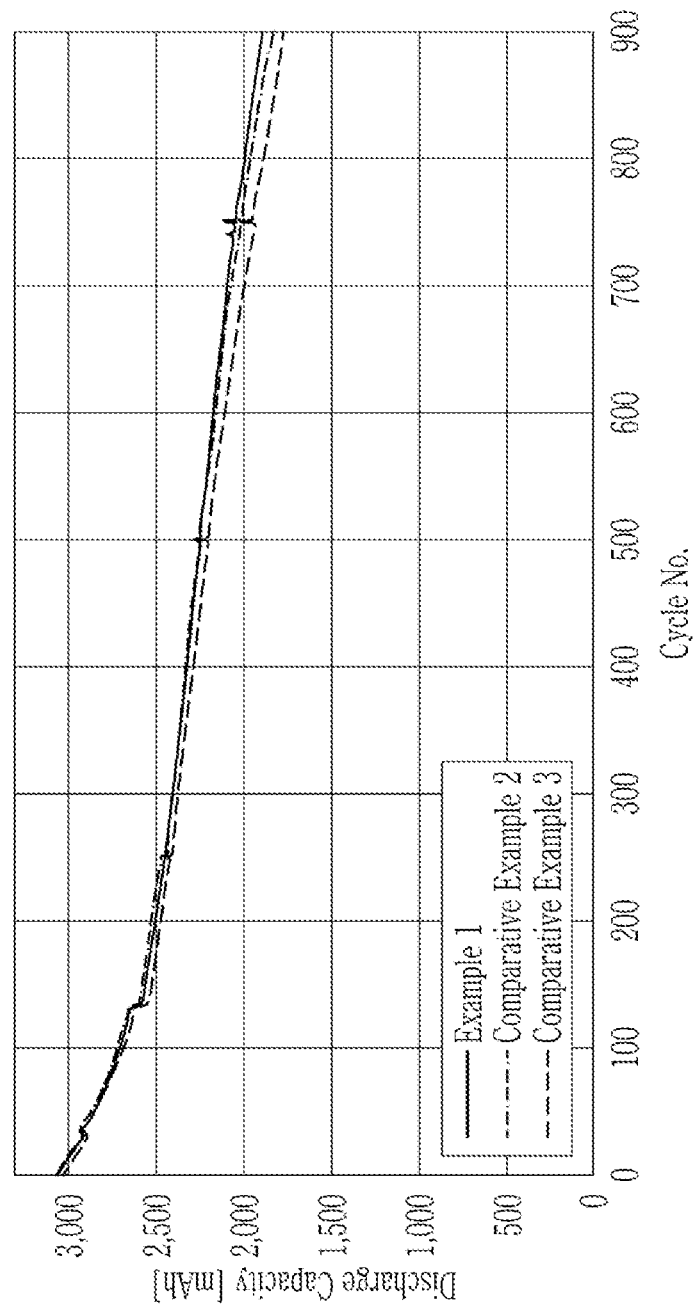
FIG. 4 is a graph showing discharge capacities measured according to cycles of rechargeable lithium battery cells according to Example 1 and Comparative Examples 2 and 3, which measured against cells having a capacity of 3,000 mAh.

FIG. 4 is a graph showing discharge capacities measured according to cycles of rechargeable lithium battery cells according to Example 1 and Comparative Examples 2 and 3, which measured against cells having a capacity of 3,000 mAh.

Referring to FIG. 3, Examples 1 to 4 (including the compound represented by Chemical Formula 1 as an additive) exhibited excellent charge and discharge cycle characteristics, compared with Comparative Example 1 (not including the compound represented by Chemical Formula 1 as an additive).

In addition, referring to FIG. 4, when an additive including a cyclic phosphone functional group according to an embodiment was used (Example 1), excellent charge and discharge cycle characteristics were obtained, compared with when an additive including a linear phosphone functional group was used (Comparative Examples 2 and 3).

For example, Examples 1 to 4 exhibited excellent charge and discharge cycle characteristics, compared with Comparative Examples 1 to 3, and accordingly, a rechargeable lithium battery cell including the compound represented by Chemical Formula 1 as an additive exhibited excellent cycle-life characteristics.

Evaluation 3: Evaluation of Storage Characteristics at High Temperature

Figure 5:
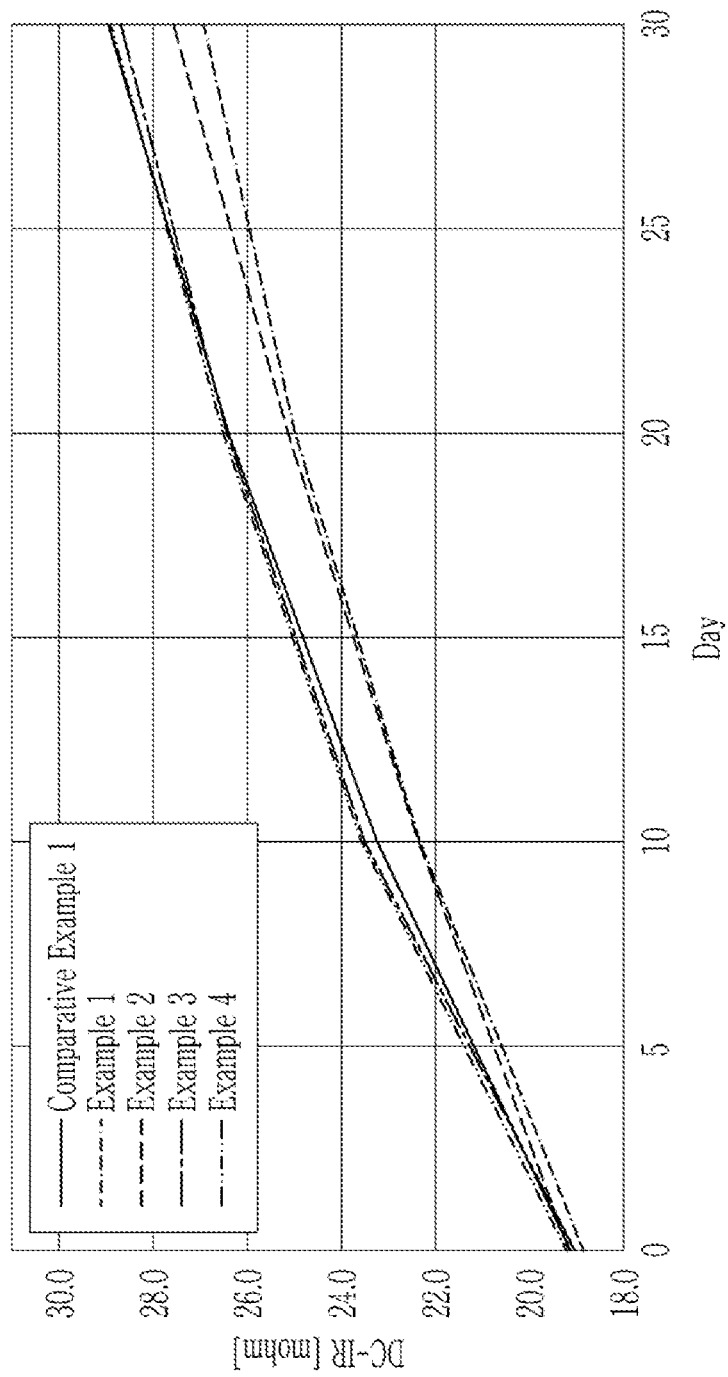
FIG. 5 is a graph showing an internal resistance increase rate when the rechargeable lithium battery cells according to Examples 1 to 4 and Comparative Example 1 are left at a high temperature, which measured against cells having a capacity of 2,500 mAh.
Figure 6:
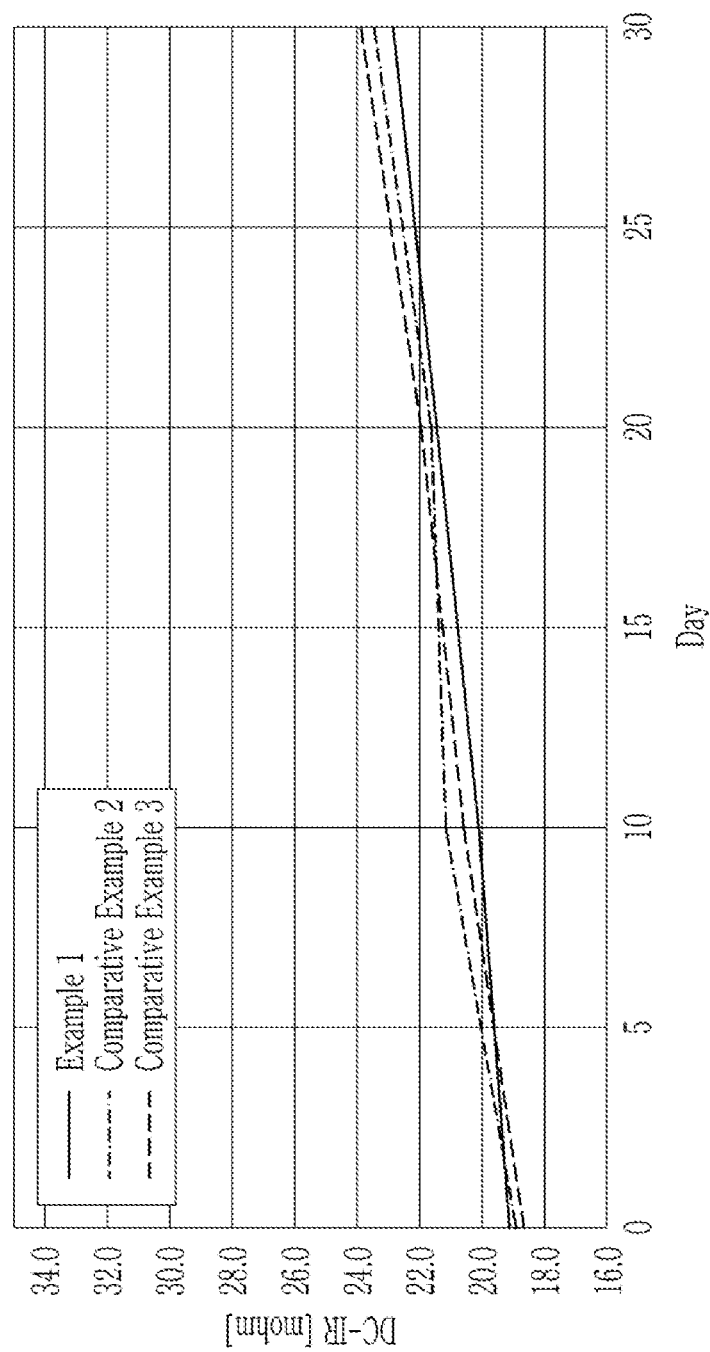
FIG. 6 is a graph showing an internal resistance increase rate when the rechargeable lithium battery cells according to Example 1 and Comparative Examples 2 and 3 are left at a high temperature, which measured against cells having a capacity of 3,000 mAh.

Each rechargeable lithium battery cell according to Examples 1 to 4 and Comparative Examples 1 to 3 were stored at 60° C. in a state of charge (SOC=100%) for 30 days to evaluate an internal resistance increase rate at a high temperature (60° C.) storage, and the results are shown in Table 1 and FIGS. 5 and 6.

DC-IR (direct current internal resistance) was measured according to the following method.

The cells of Examples 1 to 4 and Comparative Examples 1 to 3 were charged at 4 A and 4.2 V at ambient temperature (25° C.) and then, cut off at 100 mA and paused for 30 minutes. Subsequently, the cells were respectively discharged at 10 A for 10 seconds, at 1 A for 10 seconds, and at 10 A for 4 seconds and then, measured with respect to a current and a voltage at 18 seconds and at 23 seconds to calculate initial resistance (a difference between resistance at 18 seconds and resistance at 23 seconds) according to $\Delta R = \Delta V / \Delta I$.

The cells were respectively stored under a charge condition of 0.2 C and 4.2 V at 60° C. for 10 days, 20 days, and 30 days, then, DC-IR was measured and the results are shown in FIGS. 5 and 6, and each internal resistance increase rate was calculated before and after the storage according to Equation 1, and the results are shown in Table 1.

Internal resistance increase rate ($\Delta DC\text{-}IR$ (%))=[DC-IR after the storage for 30 days/initial DC-IR]× 100     <Equation 1>

Table 1 shows results of an initial DC-IR and an internal resistance increase rate when the rechargeable lithium battery cells according to Examples 1 to 4 and Comparative Example 1 are left at a high temperature, which measured against cells having a capacity of 2,500 mAh.

FIG. 5 is a graph showing an internal resistance increase rate when the rechargeable lithium battery cells according to Examples 1 to 4 and Comparative Example 1 are left at a high temperature, which measured against cells having a capacity of 2,500 mAh.

FIG. 6 is a graph showing an internal resistance increase rate when the rechargeable lithium battery cells according to Example 1 and Comparative Examples 2 and 3 are left at a high temperature, which measured against cells having a capacity of 3,000 mAh.

TABLE 1

| | | 60° C. @30 days | |
|---|---|---|---|
| | Initial DC-IR (mOhm) | DC-IR (mOhm) | ΔDC-IR (%) |
| Comparative Example 1 | 19.14 | 28.98 | 151 |
| Example 1 | 18.79 | 26.89 | 143 |

TABLE 1-continued

| | Initial DC-IR (mOhm) | 60° C. @30 days | |
| | | DC-IR (mOhm) | ΔDC-IR (%) |
|---|---|---|---|
| Example 2 | 19.10 | 27.53 | 144 |
| Example 3 | 18.99 | 28.65 | 151 |
| Example 4 | 19.15 | 28.97 | 151 |

Referring to FIG. 5 and Table 1, the battery cells of Examples 1 and 2 exhibited lowered internal resistance increase rates before and after the storage, compared with those of Comparative Example 1.

Referring to FIG. 6, the battery cell of Example 1 exhibited lowered internal resistance increase rates before and after the storage, compared with those of Comparative Examples 2 and 3.

From this, the battery cells of Examples 1 and 2 exhibited improved temperature stability compared with those of Comparative Examples 1 to 3.

By way of summation and review, $LiPF_6$ may be used as a lithium salt of an electrolyte, and may react with an electrolytic solvent to promote depletion of a solvent and generate a large amount of gas. When $LiPF_6$ is decomposed, it generates LiF and $PF_5$, which may lead to electrolyte depletion in the battery, resulting in degradation in high temperature performance and poor safety.

An electrolyte according to an embodiment may help suppress side reactions of such a lithium salt and may help improve the performance of the battery.

One or more embodiments may provide an additive capable of providing high temperature stability to help improve battery performance.

A rechargeable lithium battery having improved high temperature stability and cycle-life characteristics may be implemented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An additive represented by Chemical Formula 1:

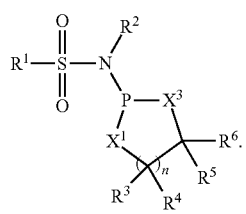

[Chemical Formula 1]

wherein, in Chemical Formula 1,
$X^1$ and $X^2$ are each independently O, S, $CR^aR^b$, or $NR^c$, at least one of $X^1$ and $X^2$ being O or S,
$R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group,
$R^a$, $R^b$, $R^c$, and $R^3$ to $R^6$ are each independently hydrogen, a substituted or unsubstituted C1 to C5 alkyl group, a substituted or unsubstituted C2 to C5 alkenyl group, or a combination thereof, and
n is an integer selected from 1 to 3.

2. The additive as claimed in claim 1, wherein the additive represented by Chemical Formula 1 is represented by Chemical Formula 1A:

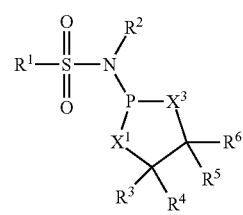

[Chemical Formula 1A]

wherein, in Chemical Formula 1A,
$X^1$ and $X^2$ are each independently O, S, $CR^aR^b$, or $NR^c$, at least one of $X^1$ and $X^2$ being O or S,
$R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, and
$R^a$, $R^b$, $R^c$, and $R^3$ to $R^6$ are each independently hydrogen, a substituted or unsubstituted C1 to C5 alkyl group, a substituted or unsubstituted C2 to C5 alkenyl group, or a combination thereof.

3. The additive as claimed in claim 1, the additive represented by Chemical Formula 1 is represented by one of Chemical Formula 1-1 to Chemical Formula 1-3:

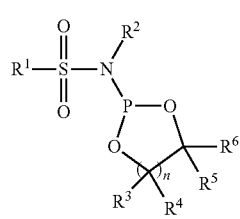

[Chemical Formula 1-1]

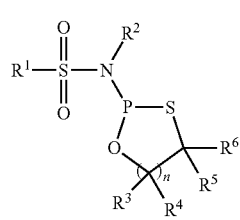

[Chemical Formula 1-2]

[Chemical Formula 1-3]

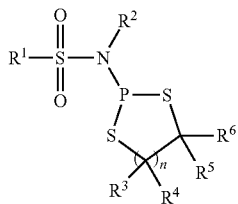

wherein, in Chemical Formula 1-1 to Chemical Formula 1-3, $R^1$ and $R^2$ are each independently a substituted or unsubstituted C1 to C10 alkyl group, a substituted or unsubstituted C1 to C10 alkoxy group, a substituted or unsubstituted C2 to C10 alkenyl group, a substituted or unsubstituted C3 to C10 cycloalkyl group, a substituted or unsubstituted C3 to C10 cycloalkenyl group, or a substituted or unsubstituted C6 to C20 aryl group, $R^3$ to $R^6$ are each independently hydrogen, a substituted or unsubstituted C1 to C5 alkyl group, a substituted or unsubstituted C2 to C5 alkenyl group, or a combination thereof, and n is an integer selected from 1 to 3.

4. The additive as claimed in claim 1, wherein $R^1$ and $R^2$ of Chemical Formula 1 are each independently a substituted or unsubstituted C1 to C10 alkyl group or a substituted or unsubstituted C1 to C5 alkenyl group.

5. An electrolyte for a rechargeable lithium battery, the electrolyte comprising:
a non-aqueous organic solvent,
a lithium salt, and
the additive as claimed in claim 1.

6. The electrolyte as claimed in claim 5, wherein the additive is included in the electrolyte in an amount of about 0.1 wt % to about 10 wt %, based on a total weight of the electrolyte.

7. The electrolyte as claimed in claim 5, wherein the additive is included in the electrolyte in an amount of about 0.1 wt % to about 3.0 wt %, based on a total weight of the electrolyte.

8. A rechargeable lithium battery, comprising:
a positive electrode including a positive active material;
a negative electrode including a negative active material; and
the electrolyte as claimed in claim 5.

9. The rechargeable lithium battery as claimed in claim 8, wherein the positive active material includes a composite oxide including cobalt, manganese, nickel, or a combination thereof, and lithium.

10. The rechargeable lithium battery as claimed in claim 8, wherein the positive active material is represented by Chemical Formula 2:

$$Li_aM^1_{1-y1-z1}M^2_{y1}M^3_{z1}O_2$$ [Chemical Formula 2]

wherein, in Chemical Formula 2,
$0.9 \leq a \leq 1.8$, $0 \leq y1 < 1$, $0 \leq z1 < 1$, $0 \leq y1+z1 < 1$, and $M^1$, $M^2$, and $M^3$ are independently Ni, Co, Mn, Al, Sr, Mg, La, or a combination thereof.

* * * * *